United States Patent
Yokomizo et al.

(10) Patent No.: US 9,688,854 B2
(45) Date of Patent: Jun. 27, 2017

(54) MATERIAL FOR MOLDING, SHAPED PRODUCT THEREFROM, AND METHOD FOR MANUFACTURING THE SHAPED PRODUCT

(71) Applicant: Teijin Limited, Osaka-shi, Osaka (JP)

(72) Inventors: Hodaka Yokomizo, Matsuyama (JP); Takeshi Matsuda, Matsuyama (JP); Takashi Ito, Matsuyama (JP); Ikko Furukawa, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 0 days.

(21) Appl. No.: 14/384,857

(22) PCT Filed: Mar. 12, 2013

(86) PCT No.: PCT/JP2013/056792
§ 371 (c)(1),
(2) Date: Sep. 12, 2014

(87) PCT Pub. No.: WO2013/137246
PCT Pub. Date: Sep. 19, 2013

(65) Prior Publication Data
US 2015/0044461 A1    Feb. 12, 2015

(30) Foreign Application Priority Data

Mar. 14, 2012  (JP) .................................. 2012-057323

(51) Int. Cl.
| | |
|---|---|
| *C08L 69/00* | (2006.01) |
| *C08J 5/06* | (2006.01) |
| *C08K 9/04* | (2006.01) |
| *C08K 9/08* | (2006.01) |
| *C08K 5/521* | (2006.01) |
| *C08K 7/06* | (2006.01) |
| *B29K 69/00* | (2006.01) |
| *B29K 307/04* | (2006.01) |

(52) U.S. Cl.
CPC .................. *C08L 69/00* (2013.01); *C08J 5/06* (2013.01); *C08K 5/521* (2013.01); *C08K 7/06* (2013.01); *C08K 9/04* (2013.01); *C08K 9/08* (2013.01); *B29K 2069/00* (2013.01); *B29K 2307/04* (2013.01); *C08J 2369/00* (2013.01); *Y10T 428/2918* (2015.01)

(58) Field of Classification Search
CPC ......... C08J 5/06; C08J 2369/00; C08K 5/521; C08K 9/04; C08K 9/08; C08L 69/00; B29K 2069/00
See application file for complete search history.

(56) References Cited

U.S. PATENT DOCUMENTS

| | | | | |
|---|---|---|---|---|
| 4,474,906 | A * | 10/1984 | Nakama et al. | ............... 428/367 |
| 5,686,181 | A | 11/1997 | Takano et al. | |
| 7,078,098 | B1 * | 7/2006 | Woodside et al. | ............ 428/367 |
| 2001/0023937 | A1 | 9/2001 | Patel | |
| 2009/0186967 | A1 * | 7/2009 | Akada et al. | ................. 524/108 |
| 2012/0028047 | A1 | 2/2012 | Imai et al. | |
| 2012/0129990 | A1 | 5/2012 | Kikuchi et al. | |

FOREIGN PATENT DOCUMENTS

| | | |
|---|---|---|
| JP | H01-271439 A | 10/1989 |
| JP | H03-121146 A | 5/1991 |
| JP | H03-181528 A | 8/1991 |
| JP | H05-112657 A | 5/1993 |
| JP | H06-166961 A | 6/1994 |
| JP | 2001240738 A | 9/2001 |
| JP | 2002212876 A | 7/2002 |
| JP | 2003-026911 A | 1/2003 |
| JP | 2004244531 A | 9/2004 |
| JP | 4849196 B1 | 1/2012 |
| JP | 2013-011050 A | 1/2013 |
| WO | 2010/107022 A1 | 9/2010 |

OTHER PUBLICATIONS

Computerized English translation to Japanese Patent Application Publication No. 2003-026911 to Kurasawa et al. (2003), obtained from Japanese Patent Office website.*
Jun. 18, 2013—International Search Report—Int'l App PCT/JP2013/056792.
Apr. 9, 2014—International Preliminary Report on Patentability—Int'l App PCT/JP2013/056792.
Jul. 8, 2014—(JP) Notification of Reasons for Refusal—App 2014-504926—Eng Tran.
Feb. 18, 2015—(EP) Supplementary Search Report—App 13761369.

* cited by examiner

*Primary Examiner* — Jeremy R Pierce
(74) *Attorney, Agent, or Firm* — Banner & Witcoff, Ltd.

(57) ABSTRACT

There is provided a material for molding including: carbon fiber bundles which are easily impregnated including carbon fibers and at least one impregnation aid in an amount of 3 to 15 parts by mass based on 100 parts by mass of the carbon fibers, the at least one impregnation aid satisfying specific requirements; and a polycarbonate is adhered thereto in an amount of 50 to 2000 parts by mass.

20 Claims, No Drawings

MATERIAL FOR MOLDING, SHAPED PRODUCT THEREFROM, AND METHOD FOR MANUFACTURING THE SHAPED PRODUCT

CROSS REFERENCE TO RELATED APPLICATIONS

This is a U.S. National Phase Application under 35 U.S.C. §371 of International Application No. PCT/JP2013/056792, filed Mar. 12, 2013 and published Under PCT Article 21(2), which claims priority to Japanese Application No. 2012-057323, filed Mar. 14, 2012 the entire disclosure of which is incorporated herein by reference.

TECHNICAL FIELD

The present invention relates to a material for molding including carbon fiber bundles which are easily impregnated and a polycarbonate adherent thereto, a shaped product obtained from the material for molding and having excellent mechanical properties, and a method for manufacturing the shaped product.

BACKGROUND ART

A known technique for obtaining a resin material which has high strength and in which a brittle fracture tends to be suppressed is to reinforce a resin with carbon fibers to obtain a composite material. In particular, a composite material obtained by reinforcing a thermoplastic resin as a matrix resin with carbon fibers (the composite material are also called a carbon-fiber-reinforced thermoplastic resin, and are hereinafter often abbreviated to CFRTP) is excellent in terms of processability and suitability for recyclability and are expected to be utilized in various fields.

As a method for manufacturing a composite material including carbon fibers and a thermoplastic resin, a method in which carbon fiber bundles are impregnated with a molten-state thermoplastic resin having a relatively high viscosity to obtain a composite material. In this manufacturing method, it is necessary that an impregnation treatment for carbon fiber bundles with a thermoplastic resin is conducted for a long term at an excessively high pressure under a condition where a melt viscosity of the thermoplastic resin is lowered by elevating an ambient temperature, in order to avoid a trouble that strength of a molded article is reduced due to insufficient impregnation. In such an impregnation treatment for a long term at a high pressure, there has been a problem, for example, that manufacturing cost is increased.

As techniques for facilitating the impregnation of a thermoplastic resin into carbon fiber bundles, a method in which carbon fibers are intertwined with thermoplastic resin fibers to prepare fiber bundles, and heat and pressure are applied thereto to melt the thermoplastic resin so as to facilitate impregnation (patent document 1), a method in which carbon fiber bundles are impregnated with a molten resin having a low molecular weight and then impregnated with a thermoplastic resin having a high molecular weight (patent document 2), and a method in which carbon fibers are opened in a bath of a molten resin and are impregnated therewith (patent document 3), and the like, are disclosed. Furthermore, patent document 4 describes a method for facilitating impregnation of a thermoplastic resin into carbon fibers themselves, the method for adjusting a sizing agent of the carbon fibers to be a sizing agent having good wettability with the resin.

As described above, in the conventional production methods, it has been necessary to conduct an independent impregnation step under special conditions therein in order to sufficiently impregnate reinforcing fiber bundles with a thermoplastic resin. Because of this, the conventional methods are still unable to provide CFRTP products (shaped products) with excellent properties and appearance at such a low manufacturing cost that these products are increasingly usable in various applications, and do not sufficiently meet expectations of each field for CFRTP. In particular, with respect to CFRTP in which a polycarbonate is used as the thermoplastic resin, the problem concerning impregnation difficulty tends to arise in the conventional manufacturing methods because polycarbonates are resins having an especially high melt viscosity, and it has been desired to immediately solve this problem.

CITATION LIST

Patent Documents

Patent Document 1: JP-A-3-121146
Patent Document 2: JP-A-3-181528
Patent Document 3: JP-A-5-112657
Patent Document 4: JP-A-6-166961

SUMMARY OF INVENTION

Problem that Invention is to Solve

An object of the invention is to provide a carbon-fiber-reinforced shaped product of polycarbonate, the shaped product having excellent properties and an excellent appearance, a method for manufacturing the shaped product by a simple process without incurring an increase in manufacturing cost, and a material for molding making the manufacturing method possible.

Means for Solving the Problem

The present inventors, during investigations for solving the conventional problems described above, have found that carbon fiber bundles including a specific compound (hereinafter, the bundles are referred to as carbon fiber bundles which are easily impregnated) are exceedingly easily impregnated with plasticated polycarbonates. Furthermore, the inventors have discovered a surprising phenomenon in which when a polycarbonate is adhered to the carbon fiber bundles which are easily impregnated to obtain a material for molding and this material for molding is made to be present in a molding die under a condition at the plasticizing temperature of the polycarbonate, then the polycarbonate is impregnated into the carbon fiber bundles which are easily impregnated and spreads in the die while dispersing the carbon fiber bundles. The inventors thus have found that a shaped product of a composite material having excellent properties and an excellent appearance can be produced without conducting any treatment for impregnating reinforcing fibers with a thermoplastic resin in an independent step, as in conventional techniques, and have completed the invention. Essential points of the invention are shown below.

1. A material for molding characterized by including: carbon fiber bundles which are easily impregnated including carbon fibers and at least one impregnation aid in an amount of 3 to 15 parts by mass based on 100 parts by mass of the carbon fibers, the at least one impregnation aid satisfying the following requirements 1 and 2; and a polycarbonate in an amount of 50 to 2,000 parts by mass based on 100 parts by mass of the carbon fibers, the polycarbonate adhered to the carbon fiber bundles which are easily impregnated.

Requirement 1: the liquid at 300° C. has a viscosity of 10 Pa·s or less,

Requirement 2: a reduction ratio in glass transition temperature ($\Delta Tg$) of larger than 2 [° C./%], the reduction ratio in glass transition temperature ($\Delta Tg$) being defined by the following expression (A) including the glass transition temperature $Tg_1$[° C.] of a resin composition obtained by incorporating the impregnation aid in an amount of 1 part by mass to 100 parts by mass based on 100 parts by mass of the polycarbonate, the glass transition temperature $Tg_0$[° C.] of the polycarbonate, and the content (%) of the impregnation aid.

Reduction ratio in glass transition temperature
$(\Delta Tg)[° C./\%]=[(Tg_0[° C.])-(Tg_1[° C.])]/$(content of impregnation aid[%])     (A)

wherein the content of impregnation aid [%] is defined by the following expression (B).

Content of impregnation aid[%]=100×(amount of impregnation aid [parts by mass])/(amount of polycarbonate [parts by mass])     (B)

2. The material for molding as described above wherein the impregnation aid is at least one selected from the group consisting of a phosphoric acid ester and a polyester based on an aliphatic hydroxycarboxylic acid.

3. The material for molding as described above characterized in that the phosphoric acid ester is an aromatic phosphoric acid ester having a boiling point at ordinary pressure of 340° C. or higher and a loss on heating at 300° C. in a nitrogen atmosphere of 2%/min. or less.

4. The material for molding as described above characterized in that the aromatic phosphoric acid ester is represented by the following general formula (1):

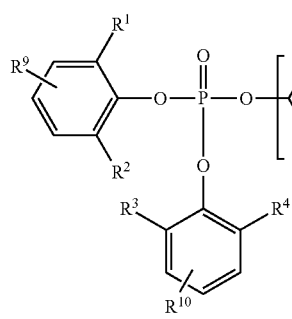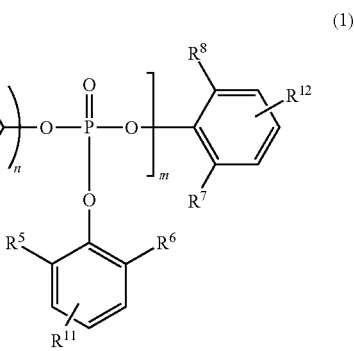

(1)

(in general formula (1), $R^1$ to $R^{12}$ are each independently a hydrogen atom or an alkyl group having 1 to 4 carbon atoms, X is a bond, —$CH_2$—, —$C(CH_3)_2$—, —S—, —$SO_2$—, —O—, —CO—, or —N=N—, n is an integer of 0 or 1, and m is an integer of 0 to 5).

5. The material for molding as described above wherein the polyester based on an aliphatic hydroxycarboxylic acid is at least one selected from the group consisting of a homopolymer of ε-caprolactone, δ-caprolactone, β-propiolactone, γ-butyrolactone, δ-valerolactone, γ-valerolactone, and enantholactone, the homopolymers having a weight average molecular weight of 3,000 to 50,000, and a copolymer of two or more of these, each having a weight average molecular weight of 3,000 to 50,000.

6. The material for molding as described above which has a core/sheath structure wherein the carbon fiber bundle which is easily impregnated is a core component and the polycarbonate is a sheath component.

7. The material for molding as described above which is in a form of a pellet.

8. The material for molding as described above wherein the pellet has a longitudinal direction length of 3 to 10 mm.

9. A shaped product formed from the material for molding as described above.

10. The shaped product as described above characterized in that the carbon fibers derived from the carbon fiber bundles which are easily impregnated are dispersed in a state of having an average fiber length of 0.3 mm or more.

11. The shaped product as described above wherein a content of carbon fibers (% by mass) and a tensile strength of the material for molding determined by examination of a 4 mm dumbbell according to ISO 527 have a relationship satisfying the following expression (C):

[Content of carbon fibers (% by mass)]×3+90<[tensile strength (MPa)]     (C).

12. A method for manufacturing the shaped product as described above, the method being characterized by making the material for molding be present in a mold under a condition of the plasticizing temperature or more of the polycarbonate to impregnate the polycarbonate into the carbon fiber bundles which are easily impregnated in the material for molding, molding the material for molding while separating and dispersing the carbon fiber bundles in the carbon fiber bundles which are easily impregnated, and then cooling the molded material.

Advantageous Effects of Invention

According to the invention, it is possible to provide a carbon-fiber-reinforced shaped product of polycarbonate having excellent properties and an excellent appearance, a simple method for manufacturing the shaped product without incurring an increase in production cost, and a material for molding making the manufacturing method possible.

EMBODIMENTS FOR CARRYING OUT INVENTION

The present invention relates to: a material for molding characterized by including: carbon fiber bundles which are easily impregnated including carbon fibers and at least one impregnation aid in an amount of 3 to 15 parts by mass based on 100 parts by mass of the carbon fibers, the at least one impregnation aid satisfying the following requirements 1 and 2; and a polycarbonate in an amount of 50 to 2,000 parts by mass based on 100 parts by mass of the carbon fibers, the polycarbonate adhered to the carbon fiber bundles which are easily impregnated; a shaped product obtained by the material for molding; and a manufacturing method for the shaped product.

Requirement 1: the liquid at 300° C. has a viscosity of 10 Pa·s or less,

Requirement 2: a reduction ratio in glass transition temperature ($\Delta Tg$) of larger than 2 [° C./%], the reduction ratio in glass transition temperature ($\Delta Tg$) being defined by the following expression (A) including the glass transition temperature $Tg_1$[° C.] of a resin composition obtained by incorporating the impregnation aid in an amount of 1 part by mass to 100 parts by mass based on 100 parts by mass of the polycarbonate, the glass transition temperature $Tg_0$[° C.] of the polycarbonate, and the content (%) of the impregnation aid.

Reduction ratio in glass transition temperature
($\Delta Tg$)[° C./%]=[($Tg_0$[° C.])−($Tg_1$[° C.])]/(content of impregnation aid[%])    (A)

wherein the content of impregnation aid [%] is defined by the following expression (B).

Content of impregnation aid[%]=100×(amount of impregnation aid [parts by mass])/(amount of polycarbonate [parts by mass])    (B)

Embodiments of the invention are explained below in detail. It is a matter of course that other embodiments can be within the scope of the invention so long as the embodiments do not depart from the spirit of the invention.

[Carbon Fiber Bundles which are Easily Impregnated]

The carbon fiber bundles which are easily impregnated in the invention are carbon fiber bundles characterized by including carbon fibers and at least one impregnation aid in an amount of 3 to 15 parts by mass based on 100 parts by mass of the carbon fibers, the at least one impregnation aid satisfying the following requirement 1 and requirement 2 and by being thereby easily impregnated with a polycarbonate (preferably, a plasticated polycarbonate).

Requirement 1: the liquid at 300° C. has a viscosity of 10 Pa·s or less,

Requirement 2: a reduction ratio in glass transition temperature ($\Delta Tg$) of larger than 2 [° C./%], the reduction ratio in glass transition temperature ($\Delta Tg$) being defined by the following expression (A) including the glass transition temperature $Tg_1$[° C.] of a resin composition obtained by incorporating the impregnation aid in an amount of 1 part by mass to 100 parts by mass based on 100 parts by mass of the polycarbonate, the glass transition temperature $Tg_0$[° C.] of the polycarbonate, and the content (%) of the impregnation aid.

Reduction ratio in glass transition temperature
($\Delta Tg$)[° C./%]=[($Tg_0$[° C.])−($Tg_1$[° C.])]/(content of impregnation aid[%])    (A)

wherein the content of impregnation aid [%] is defined by the following expression (B).

Content of impregnation aid[%]=100×(amount of impregnation aid [parts by mass])/(amount of polycarbonate [parts by mass])    (B)

The carbon fiber bundles which are easily impregnated may be any carbon fiber bundles including the impregnation aid in a specific amount relative to the carbon fibers, and there are no limitations on a production method of the carbon fiber bundles which are easily impregnated and on the state in which the carbon fibers and the impregnation aid are included. The impregnation aid used in the invention should satisfy requirement 1, and this means that the impregnation aid is in a low viscosity state at 300° C., which is a representative processing temperature for general purpose polycarbonates, and is capable of viscosity measurement at 300° C. The viscosity of the liquid of the impregnation aid at 300° C. is preferably 8 Pa·s or less, more preferably 6 Pa·s or less.

With respect to requirement 1, as a method for measuring the viscosity of the impregnation aid as a liquid, use of a rotational viscometer is suitable. Specific examples thereof include a measurement method by using a parallel-plate viscometer equipped with a high-temperature chamber.

Furthermore, the impregnation aid used in the invention should satisfy requirement 2. With respect to requirement 2, the impregnation aid needs not satisfy [reduction ratio in glass transition temperature ($\Delta Tg$)]>(2 [° C./%]) throughout the whole content range of 1 to 100 parts by mass based on 100 parts by mass of the polycarbonate, and a part of the content range shows a reduction ratio in glass transition temperature ($\Delta Tg$) of larger than 2.

By a reduction ratio in glass transition temperature ($\Delta Tg$) of larger than 2° C./%, an effect of facilitating impregnation is developed, and a $\Delta Tg$ larger than 3° C./% is more preferable. In the case of a $\Delta Tg$ of 2° C./% or less, it represents a state where this impregnation aid is not made to be compatible with the polycarbonate and therefore it is presumed that a measured value of Tg is substantially the same as the Tg of the polycarbonate. Even when an impregnation aid having a $\Delta Tg$ of 2° C./% or less is added to carbon fiber bundles, and a resultant in which a polycarbonate is adhered thereto is molded, this impregnation aid shows a considerably low impregnation facilitating effect, resulting in an obtained shaped product has dispersion failures of the carbon fibers.

With respect to requirement 2, examples of methods for measuring the glass transition temperature of the polycarbonate or of a resin composition including the polycarbonate and the impregnation aid include a method in which a differential scanning calorimeter (DSC) is used.

The carbon fiber bundles which are easily impregnated used in the invention may be one which contains a plurality of impregnation aids. It is preferable that the impregnation aid used in the invention is at least one selected from the group consisting of a phosphoric acid ester and a polyester based on an aliphatic hydroxycarboxylic acid. It is a matter of course that the impregnation aids may include both a phosphoric acid ester and a polyester based on an aliphatic hydroxycarboxylic acid. The phosphoric acid ester and polyesters based on an aliphatic hydroxycarboxylic acid which are usable as an impregnation aid will be described later in detail.

Representative methods for producing the carbon fiber bundles which are easily impregnated include a method in which an impregnation aid is impregnated into general-purpose carbon fiber bundles by at least one method selected from the group consisting of a dipping method, a spraying method, a roller transfer method, a slit coater method, and the like. In the case where an impregnation aid is impregnated into carbon fiber bundles by any of these methods, it is thought that the impregnation aid is mainly adhered to the surface of the carbon fiber bundles, and some parts of the impregnation aid are impregnated into inner parts of the carbon fiber bundles.

With respect to the form of the impregnation aid in the production of the carbon fiber bundles which are easily impregnated, the impregnation aid can be handled as an aqueous emulsion, a solution obtained by dilution with an organic solvent, or a heated liquid in a viscous or molten state. A preferred combination of a production method and a form of an impregnation aid includes a dipping or a roller transfer method in the case of an aqueous emulsion. This combination necessitates a drying step in which the carbon fiber bundles are dried in an atmosphere of 100° C. or more in order to sufficiently remove the water. In the case of a heated viscous liquid, a general coating technique such as a slit coater method is usable, and it is possible to adhere the heated viscous liquid in a suitable amount to the carbon fiber bundles and then to perform even adhesion with a smoothing roll or the like.

In order to obtain a shaped product in which the carbon fibers are evenly dispersed in the polycarbonate by molding the material for molding of the invention, it is preferred to adhere the impregnation aid to the carbon fiber bundles as evenly as possible. Examples of methods for more evenly adhering an impregnation aid to carbon fiber bundles include a method in which the impregnation aid is adhered to the carbon fiber bundles by any of the methods shown above and the resultant is subjected to a re-heat treatment by heating to a temperature or more which the viscosity of the impregnation aid decreases sufficiently. For the heat treatment, a hot air, a hot plate, a roller, an infrared-ray heater, and the like, can be used. It is preferred to use rollers.

[Carbon Fibers]

The carbon fibers contained in the material for molding of the invention may be any carbon fibers, such as polyacrylonitrile (PAN)-based, petroleum/petroleum pitch-based, rayon-based, or lignin-based carbon fibers. In particular, PAN-based carbon fibers, which are produced from PAN as a starting material, are preferred because these carbon fibers are excellent in terms of factory-scale manufacturability and mechanical property.

It is preferable to use carbon fibers having an average diameter of 5 to 10 μm. Meanwhile, general carbon fibers are carbon fiber filaments in a form of fiber bundles each constituted by 1,000 to 50,000 single fibers. Although the carbon fiber bundles in the invention include such general carbon fiber filaments, the carbon fiber bundles may include yarns obtained by superposing and doubling such carbon fiber filaments or twisted yarns obtained by twisting the yarns obtained by doubling. Also preferred as the carbon fibers contained in the material for molding of the invention are carbon fibers in which an oxygen-containing functional group is introduced into the surface thereof through a surface treatment in order to enhance adhesion between the carbon fibers and the polycarbonate.

In the case where carbon fiber bundles which are easily impregnated are produced by impregnating an impregnation aid into carbon fiber bundles as described above, it is preferable that a carbon fiber bundles treated with a sizing agent for imparting sizing property, in order to stabilize a step of evenly adhering the impregnation aid to the carbon fiber bundles. As the sizing agent, binders known to be used for manufacturing carbon fiber filaments can be used. Furthermore, carbon fiber bundles in which oil used for improving slip properties during the production remains can be used in the invention without any problem. Hereinafter, there are cases where the expression "surface-treating agent" is used as a broader term which means both an impregnation aid and other treating agents including the sizing agent or the like.

[Phosphoric Acid Esters]

The phosphoric acid esters usable as an impregnation aid in the invention are not particularly limited so long as they satisfy requirement 1 and requirement 2. Examples thereof include a phosphoric acid ester monomer or a blend of oligomeric phosphoric acid esters. Specific examples thereof include trimethyl phosphate, triethyl phosphate, tributyl phosphate, trioctyl phosphate, tributoxyethyl phosphate, and an aromatic phosphoric acid ester represented by triphenyl phosphate. Preferred is trimethyl phosphate or triphenyl phate.

Preferred from the standpoint of molding processability is a phosphoric acid ester that has a loss on heating in a nitrogen atmosphere at 300° C., which is a molding temperature for polycarbonates, of 2%/min or less and that has a boiling point at ordinary pressure of 340° C. or more. More preferred are an aromatic phosphoric acid ester which has a boiling point at ordinary pressure of 340° C. or more and which has a loss on heating at 300° C. in a nitrogen atmosphere of 2%/min or less.

In the invention, the term of ordinary pressure means a pressure which is approximately the pressure of the normal-state atmosphere (1,013 hPa) to which any operation for elevating or lowering the pressure is not intentionally performed, unless otherwise indicated. That term means an air pressure in the range of generally 800-1,050 hPa, usually 1,000-1,030 hPa, more usually 1,009-1,017 hPa. As a phosphoric acid ester having such heat resistance, an aromatic phosphoric acid ester represented by general formula (1) is suitably used.

In the invention, the aromatic phosphoric acid ester represented by general formula (1) in which $R^1$ to $R^{12}$ each represent a hydrogen atom or an alkyl group having 1 to 4 carbon atoms, such as methyl, ethyl, propyl, isopropyl, butyl, isobutyl, s-butyl, or t-butyl, is preferred because use of these esters is capable of remarkably improving melt flowability and light resistance of the shaped product. Preferred of these alkyl groups are the alkyl groups having 1 to 3 carbon atoms. More preferred is methyl and/or ethyl. Even more preferred is the case where $R^1$ to $R^8$ each independently represents a hydrogen atom or an alkyl group having 1 to 4 carbon atoms and $R^9$ to $R^{12}$ each represents a hydrogen atom. Especially preferred is the case where $R^1$ to $R^8$ each independently represent a hydrogen atom or a methyl or ethyl group and $R^9$ to $R^{12}$ each represent a hydrogen atom.

Preferred of the aromatic phosphoric acid ester represented by general formula (1) are ones in which an aromatic group represented by the formula (1):

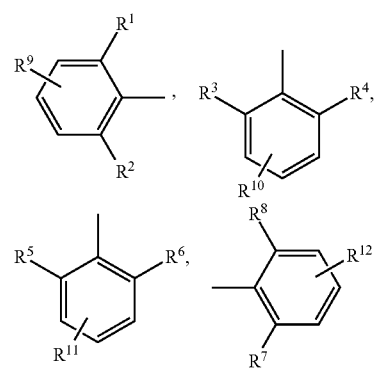

each independently represents a phenyl group, 2-methylphenyl group, 3-methylphenyl group, 4-methylphenyl group, 2-ethylphenyl group, 3-ethylphenyl group, 4-ethylphenyl group, 2-propylphenyl group, 3-propylphenyl group, 4-propylphenyl group, 2-isopropylphenyl group, 3-isopropylphenyl group, 4-isopropylphenyl group, 2-butylphenyl group, and 3-butylphenyl group. This is because these esters have high heat resistance. Among them, a phenyl group which has two alkyl groups having 1 to 3 carbon atoms, such as a methyl, an ethyl, or a propyl group. Extremely preferred are a phenyl group having, at the 2- and 6-positions, two alkyl groups having 1 to 3 carbon atoms (e.g., 2,6-dimethylphenyl, 2,6-diethylphenyl, and 2-ethyl-6-methylphenyl). Hereinafter, the expression "xylenyl" used in compound names means 2,6-dimethylphenyl unless otherwise indicated.

In general formula (1), n is an integer of 0 or 1, and is preferably 1.

In general formula (1), X is a bond, —CH$_2$—, —C(CH$_3$)$_2$—, —S—, —SO$_2$—, —O—, —CO—, or —N═N—, and preferably a bond, —CH$_2$—, or —C(CH$_3$)$_2$—, and more preferably —C(CH$_3$)$_2$—.

In general formula (1), the repeating unit m is an integer of 0 to 5, and preferably 1 or more, that is the aromatic phosphoric acid ester of formula (1) is a so-called aromatic condensed phosphate ester, more preferably an integer of 1 to 3, further preferably an integer of 1 or 2, especially preferably 1.

Especially preferred examples of the aromatic phosphoric acid ester represented by general formula (1) include at least one aromatic phosphoric acid ester selected from the group consisting of:

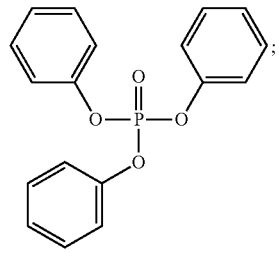

triphenyl phosphate

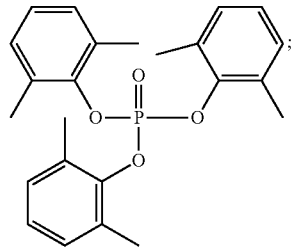

trixylenyl phosphate

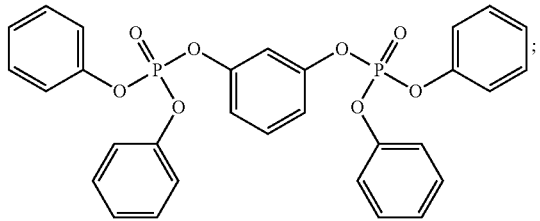

1,3-phenylene bis(diphenyl phosphate)

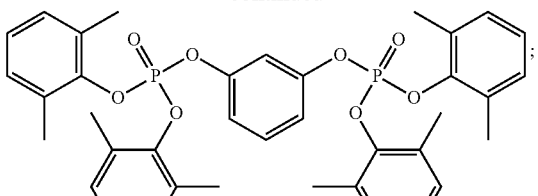

1,3-phenylene bis(dixylenyl phosphate)

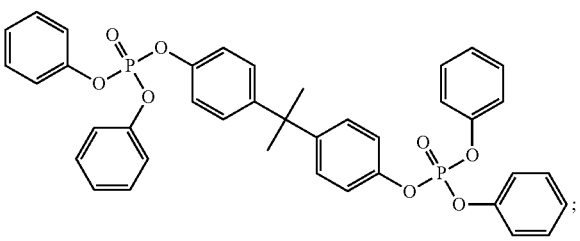

bisphenol-A bis(diphenyl phosphate)

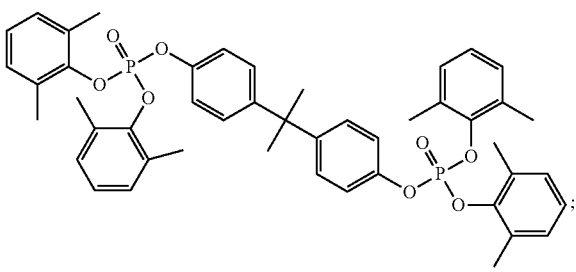

bisphenol-A bis(dixylenyl phosphate)

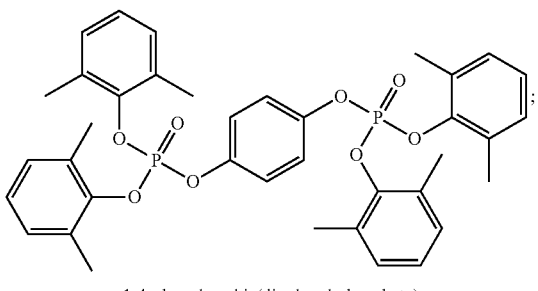

1,4-phenylene bis(dixylenyl phosphate)

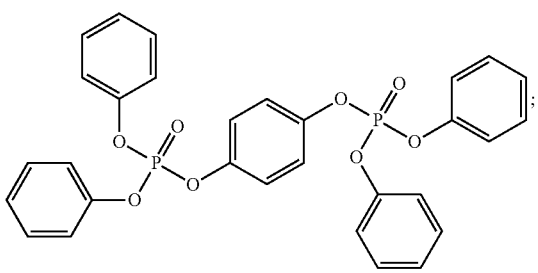

1,4-phenylene bis(diphenyl phosphate)

-continued

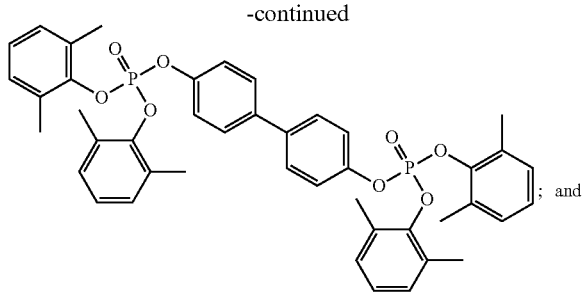

4,4'-biphenylene bis(dixylenyl phosphate)

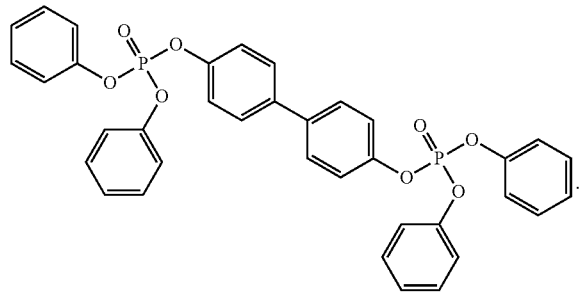

4,4'-biphenylene bis(diphenyl phosphate)

A condensed phosphate ester in which phosphoric acid esters are condensed through a polynuclear aromatic residue or heterocyclic residue, such as

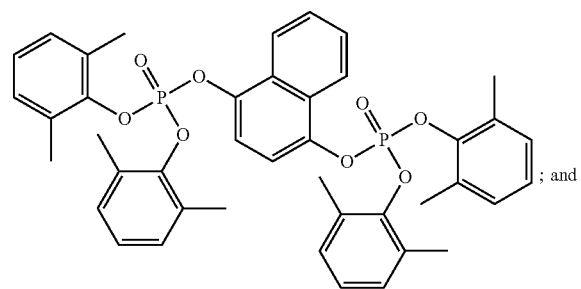

1,4-naphthalenediol bis(dixylenylphosphate):

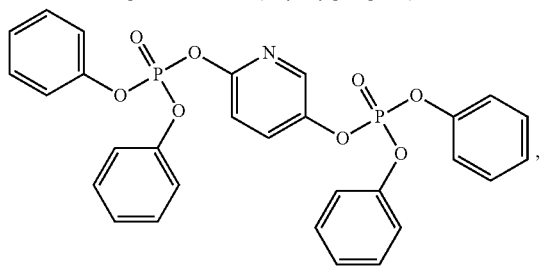

2,5-pyridinediol bis(diphenyl phosphate)

can also be used as preferred aromatic phosphoric acid esters according to the invention, although those esters are not represented by general formula (1).

The amount of the phosphoric acid ester which is contained in the carbon fiber bundles which are easily impregnated is 3 to 15 parts by mass, preferably 5 to 12 parts by mass, based on 100 parts by mass of the carbon fibers. Amounts thereof less than 3 parts by mass are undesirable because the impregnability of polycarbonates into the carbon fibers is insufficient. Amounts thereof exceeding 15 parts by mass are undesirable because the polycarbonate as a matrix resin comes to have a lowered glass transition temperature, resulting in molded articles having lowered heat resistance, although polycarbonates have excellent impregnability into the carbon fibers. In the case where a polyester based on an aliphatic hydroxycarboxylic acid is also used in combination with the phosphoric acid ester as an impregnation aid, the total amount thereof is not particularly limited so long as the total amount thereof is within that range.

As the content of the impregnation aid increases, a rate of impregnation of the matrix resin into the carbon fibers increases. Consequently, the carbon fibers receive shearing by the screw from the initial stage of screw plastication and tend to be short in fiber length.

[Polyesters based on Aliphatic Hydroxycarboxylic Acid]

The polyester based on an aliphatic hydroxycarboxylic acid which is usable as an impregnation aid in the invention is a polyester constituted by an aliphatic hydroxycarboxylic acid residue. The polyester may be either a homopolyester constituted by a residue of a single aliphatic hydroxycarboxylic acid or a copolyester including residues of a plurality of aliphatic hydroxycarboxylic acids. The polyester based on an aliphatic hydroxycarboxylic acid may be a copolyester including a residue other than an aliphatic hydroxycarboxylic acid residue, such as a diol residue or a dicarboxylic acid residue in an amount of less than 50% by mole based on the residues constituting a polymer. However, a homopolymer into which no comonomer units are intentionally incorporated is preferred from the standpoint of availability.

It is preferable that the polyester based on an aliphatic hydroxycarboxylic acid used in the invention has a weight-average molecular weight of 3,000 to 50,000. In a case when the weight-average molecular weight thereof is in the range of 3,000 to 50,000, these polyesters have a satisfactory affinity for polycarbonate resins and are easy to emulsify. The range is especially preferably 5,000 to 20,000, even more preferably 8,000 to 15,000. As a method for measuring the weight-average molecular weight, a known method such as high-temperature GPC can be used.

The polyester based on an aliphatic hydroxycarboxylic acid which is usable as an impregnation aid in the invention is not particularly limited. However, preferred are homopolymers of ε-caprolactone, δ-caprolactone, β-propiolactone, γ-butyrolactone, δ-valerolactone, γ-valerolactone, and enantholactone and copolymers of two or more of the monomers. The polyester is more preferably at least one selected from the group consisting of homopolymers of ε-caprolactone, δ-caprolactone, β-propiolactone, γ-butyrolactone, δ-valerolactone, γ-valerolactone, and enantholactone, the homopolymers each having a weight-average molecular weight of 3,000 to 50,000, and copolymers of two or more of the monomers, the copolymers each having a weight-average molecular weight of 3,000 to 50,000. A more preferred range of the weight-average molecular weight of each polymer is as shown above. Especially preferred are homopolymers of ε-caprolactone or δ-caprolactone which have a weight-average molecular weight of 3,000 to 50,000. In the invention, the expression "polymer of lactones" means not only a polymer produced by actually subjecting the lactone to ring-opening polymerization but also a polymer of the same structure produced from an aliphatic hydroxycarboxylic acid or derivative thereof which is equivalent to the lactones.

The amount of the polyester based on an aliphatic hydroxycarboxylic acid which is adhered to the carbon fiber bundles which are easily impregnated is 3 to 15 parts by mass, preferably 5 to 12 parts by mass, based on 100 parts by mass of the carbon fibers. Amounts thereof less than 3 parts by mass are undesirable because the impregnability of polycarbonates into the carbon fibers is insufficient. Amounts thereof exceeding 15 parts by mass are undesirable because the polycarbonate as a matrix resin comes to have a lowered glass transition temperature, resulting in a shaped product having lowered heat resistance, although excellent impregnability is obtained.

[Material for Molding]

The material for molding of the invention is constituted by the carbon fiber bundles which are easily impregnated described above and a polycarbonate which is adhered to the carbon fiber bundles which are easily impregnated in an amount of 50 to 2,000 parts by mass based on 100 parts by mass of the carbon fibers contained in the carbon fiber bundles which are easily impregnated. The amount of the adhered polycarbonate is more preferably 66 to 1,900 parts by mass. The shape of the material for molding of the invention is not particularly limited, and examples thereof include columnar, platy, granular, massive, fibrous (stringy), and net shapes. It is also possible to use a plurality of materials for molding having different shapes and to mold these materials.

Examples of a method for adhering a polycarbonate to the carbon fiber bundles which are easily impregnated to obtain the material for molding of the invention includes a method for covering the surface of the carbon fiber bundles which are easily impregnated with a molten-state polycarbonate, a method for casting a molten-state polycarbonate on the carbon fiber bundles which are easily impregnated arranged in parallel, using a T-die or the like to superpose a layer of the carbonate, a method for laminating a film-form polycarbonate resin on the carbon fiber bundles which are easily impregnated arranged in parallel, and a method for spraying a powdery polycarbonate resin on the carbon fiber bundles which are easily impregnated arranged in parallel. It is also possible to similarly use a lump of cut fiber bundles obtained by cutting the carbon fiber bundles which are easily impregnated into a specific length, in place of the continuous carbon fiber bundles which are easily impregnated arranged in parallel.

It is preferred that the material for molding of the invention has a core/sheath structure in which the carbon fiber bundle which is easily impregnated is a core component and the polycarbonate is a sheath component. In particular, in the case where the material for molding of the invention is used for injection molding, this material for molding is more preferably a pellet having a core/sheath structure in which the carbon fiber bundle which is easily impregnated is a core component and the polycarbonate, the core/sheath structure obtained by cutting strands including the carbon fiber bundles which are easily impregnated and a polycarbonate that covers the periphery thereof with a strand cutter. Even more preferably, this material for molding is a pellet having a longitudinal-direction length of about 3 to 10 mm (hereinafter often referred to as a core/sheath pellet). There are no particular limitations on the diameter of the core/sheath pellet. However, the diameter thereof is preferably from 1/10 to 2 times the length of the pellet, and is more preferably from 1/4 the length of the pellet to the same dimension as the length of the pellet.

[Polycarbonate]

The kind of the polycarbonate used in the invention is not particularly limited. Examples thereof include polycarbonates obtained by reacting various dihydroxyaryl compounds with phosgene or polycarbonates obtained by the transesterification reaction of a dihydroxyaryl compound with diphenyl carbonate. A representative example is a polycarbonate obtained by reacting 2,2'-bis(4-hydroxyphenyl)propane, i.e., so-called bisphenol A, with phosgene or diphenyl carbonate.

Examples of the dihydroxyaryl compounds as a starting material for the polycarbonate include bis(4-hydroxyphenyl)methane, 1,1'-bis(4-hydroxyphenyl)ethane, 2,2'-bis(4-hydroxyphenyl)propane, 2,2'-bis(4-hydroxyphenyl)butane, 2,2'-bis(4-hydroxyphenyl)octane, 2,2'-bis(4-hydroxy-3-methylphenyl)propane, 2,2'-bis(4-hydroxy-3-t-butylphenyl)propane, 2,2'-bis(3,5-dimethyl-4-hydroxyphenyl)propane, 2,2'-bis(4-hydroxy-3-cyclohexylphenyl)propane, 2,2'-bis(4-hydroxy-3-methoxyphenyl)propane, 1,1'-bis(4-hydroxyphenyl)cyclopentane, 1,1'-bis(4-hydroxyphenyl)cyclohexane, 1,1'-bis(4-hydroxyphenyl)cyclododecane, 4,4'-dihydroxyphenyl ether, 4,4'-dihydroxy-3,3'-dimethylphenyl ether, 4,4'-dihydroxydiphenyl sulfide, 4,4'-dihydroxy-3,3'-dimethyldiphenyl sulfide, 4,4'-dihydroxydiphenyl sulfoxide, 4,4'-dihydroxydiphenyl sulfone, and bis(4-hydroxyphenyl)ketone. These dihydroxyaryl compounds can be used alone or in combination of two or more thereof.

Preferred dihydroxyaryl compounds include bisphenols which is capable of forming aromatic polycarbonates having high heat resistance, bis(hydroxyphenyl)alkanes such as 2,2'-bis(4-hydroxyphenyl)propane, bis(hydroxyphenyl)cycloalkanes such as bis(4-hydroxyphenyl)cyclohexane, dihydroxydiphenyl sulfide, dihydroxydiphenyl sulfone, dihydroxydiphenyl ketone, and the like. Especially preferred dihydroxyaryl compounds include 2,2'-bis(4-hydroxyphenyl)propane, which is capable of forming bisphenol-A aromatic polycarbonates.

When a bisphenol-A aromatic polycarbonate is produced so as not to impair heat resistance, mechanical strength, and the like, a part of the bisphenol A may be replaced with another dihydroxyaryl compound. Furthermore, any of various polymers, fillers, stabilizers, pigments, or the like, may be incorporated for the purpose of enhancing flowability, appearance glossiness, flame retardancy, thermal stability, weatherability, impact resistance, or the like, so long as the incorporation thereof does not impair mechanical strength. It is also possible to incorporate a phosphoric acid ester as a flame retardant into the polycarbonate.

[Shaped Product and Method for Manufacturing Thereof]

As stated above, the material for molding of the invention is molded by an existing thermoplastic-resin molding method without subjecting the material for molding to a treatment for impregnating reinforcing fibers with a thermoplastic resin in an independent step as in conventional techniques. As a result, the polycarbonate is impregnated into the carbon fiber bundles which are easily impregnated in the material for molding, and the material for molding melts and flows, and spreads in the mold while spreading the carbon fiber bundles to obtain a shaped product having satisfactory properties.

Namely, this application further includes: an invention relating to a shaped product formed from the material for molding of the invention; and an invention relating to a method for manufacturing a shaped product characterized by making the material for molding be present in a mold under a condition of the plasticizing temperature or more of the polycarbonate, thereby impregnating the polycarbonate into the carbon fiber bundles which are easily impregnated in the material for molding, molding this material for molding while separating and dispersing the carbon fiber bundles of the carbon fiber bundles which are easily impregnated, and then cooling the molded material.

In the method of the invention for manufacturing a shaped product, the wording "separate and disperse the carbon fiber bundles of the carbon fiber bundles which are easily impregnated" means that the carbon fiber bundles are separated and dispersed to such a degree that the carbon fibers do not form a lump in the shaped product. Thus, a shaped product having excellent properties and an excellent appearance can be obtained even when carbon fiber bundles such as carbon fiber filaments are not completely separated into several thousands to tens of thousands of the constituent single carbon fibers.

When the shaped product of the invention is manufactured, the material for molding described above can be used in any of various forms suitable for the molding method employed. For example, in the case of injection molding, the material for molding can be used in the form of a pellet obtained by cutting strands constituted by the carbon fiber bundles which are easily impregnated and a polycarbonate that covers the periphery thereof, with a strand cutter into a length of about 3 to 10 mm.

In the case of obtaining a large plate shaped product, press molding is effective. In the case where press molding is conducted, a method in which a plate material for molding constituted by a layer of the carbon fiber bundles which are easily impregnated and a polycarbonate layer stacked thereon is prepared and this material for molding is heated to the plasticizing temperature or more of the polycarbonate, put in a press mold, and then molded at a specific pressing pressure. Depending on shapes, or the like, a method in which a material for molding according to the invention is hot-pressed to obtain a preform beforehand and this preform is molded is also effective.

In the case where the material for molding of the invention is used and molded to obtain a shaped product without adding any other material for molding or any additive thereto, this shaped product is equal to the material for molding in the amount of carbon fibers contained therein and the proportion thereof, that is, in composition on mass basis. Consequently, the amounts of the carbon fibers and polycarbonate contained in the shaped product of the invention and preferred ranges thereof are as described above with regard to the material for molding.

Meanwhile, in the case where the material for molding of the invention is used and molded without adding any other material for molding or any additive thereto, the amount (content) of carbon fibers determined by examining either the material for molding or the shaped product obtained can be regarded as the amount (content) of carbon fibers in the other. Even in the case where the material for molding of the invention is molded after another material for molding and additives, or the like, are added thereto, the amount (content) of carbon fibers in either the material for molding of the invention or the shaped product can be determined from the amount (content) of carbon fibers in the other through calculations from the amounts of those ingredients added.

Shaped products of conventional carbon-fiber-reinforced thermoplastic resins are obtained by molding a pellet or the like, as a material, the pellet obtained by melt-kneading a thermoplastic resin and carbon fibers with a twin-screw extruder or the like in order to evenly disperse the carbon fibers in the thermoplastic resin. In this method, however, the carbon fibers are broken in the extruder because of the kneading conducted under high shear, and the shaped product obtained has a carbon fiber length reduced to less than 0.3 mm, resulting in a decrease in the property-enhancing effect of the fibers. In contrast, the shaped product obtained from the material for molding of the invention is excellent in terms of the impregnability of polycarbonate into the carbon fiber bundles, and therefore the carbon fiber bundles need not be kneaded together with the molten resin under high shear. Because of this, the shaped product obtained contains the carbon fibers which remain long, and has excellent mechanical strength.

The shaped product of the invention is preferably a shaped product in which the carbon fibers resulting from separation of the carbon fiber bundles which are easily impregnated are dispersed so as to have an average fiber length of 0.3 mm or more, and more preferably is a shaped product in which the carbon fibers are dispersed so as to have an average fiber length of 0.4 mm or more. In the shaped product of the invention, there is no particular upper limit on the average fiber length of the carbon fibers remaining therein, and the average length thereof depends on applications and the molding method employed. For example, in the case of a shaped product obtained by injection molding in which a pellet obtained by cutting, with a strand cutter, strands constituted by the carbon fiber bundles which are easily impregnated and a polycarbonate that covers the periphery thereof are used as a material for molding, the average fiber length of the carbon fibers is generally about 10 mm or less. The higher the degree of impregnation of carbon fiber bundles with a thermoplastic resin is, the more the carbon fibers are apt to break during injection molding. Thus, there are often cases where injection-shaped products have an average fiber length of 2 mm or less.

Furthermore, it is preferable that the shaped product of the invention, when examined with respect to a tensile specimen having a thickness of 4 mm according to ISO standard 527, is satisfy a relationship represented by the following expression (C).

[Content of carbon fibers (% by weight)]×3+90< [tensile strength (MPa)] (C)

The establishment of the expression (C) means that the tensile strength of the shaped product of a carbon fiber reinforced thermoplastic resin is exceedingly high for the content of carbon fibers and that this shaped product is highly preferred from the standpoints of cost and properties.

EXAMPLES

The invention will be explained below in detail by reference to Examples, but the invention should not be construed as being limited to the following Examples. The impregnation aids used in the Examples and Comparative Examples are shown below. The viscosity of the liquid of each of the impregnation aids was measured with a parallel-plate viscometer using a viscoelastometer (RDA2) manufactured by Rheometric Inc. under the conditions of a strain rate of 1/s and 300° C. The glass transition temperatures of the polycarbonate and of the resin composition obtained by incorporating an impregnation aid into the polycarbonate were measured using thermal analyzer DSC-Q20, manufactured by TA Instruments Inc., under the conditions of a heating rate of 20° C./min.

1) Bisphenol-A bis(diphenyl phosphate): The viscosity of the liquid of bisphenol-A bis(diphenyl phosphate) at 300° C. is 2.8 Pa·s. A resin composition obtained by blending a polycarbonate ($Tg_0$=143° C.) and bisphenol-A bis(diphenyl phosphate) in an amount of 10 parts by mass based on 100 parts by mass of the polycarbonate shows a glass transition temperature $Tg_1$ of 108° C., and the reduction ratio in glass transition temperature ($\Delta Tg$) defined by expression (A) is 3.5° C./%, which is larger than 2.

2) Polycaprolactone: The viscosity of the liquid of a polycaprolactone at 300° C. is 6 Pa·s. A resin composition obtained by blending a polycarbonate ($Tg_0$=143° C.) and the polycaprolactone in an amount of 5 parts by mass based on 100 parts by mass of the polycarbonate shows a glass transition temperature $Tg_1$ of 127° C., and the reduction ratio in glass transition temperature ($\Delta Tg$) defined by expression (A) is 3.2° C./%, which is larger than 2.

3) Trimethyl phosphate: The viscosity of the liquid of trimethyl phosphate at 300° C. is 1.2 mPa·s. A resin composition obtained by blending a polycarbonate ($Tg_0$=143° C.) and trimethyl phosphate in an amount of 2 parts by mass based on 100 parts by mass of the polycarbonate shows a glass transition temperature $Tg_1$ of 136° C., and the reduction in glass transition temperature ($\Delta Tg$) defined by expression (A) is 3.5° C./%, which is larger than 2.

4) Triphenyl phosphate: The viscosity of the liquid of triphenyl phosphate at 300° C. is 2 mPa·s. A resin composition obtained by blending a polycarbonate ($Tg_0$=143° C.) and trimethyl phosphate in an amount of 5 parts by mass based on 100 parts by mass of the polycarbonate shows a glass transition temperature $Tg_1$ of 125° C., and the reduction ratio in glass transition temperature ($\Delta Tg$) defined by expression (A) is 3.6° C./%, which is larger than 2.

5) Copolyester Vylon 220: Copolyester Vylon 220 (manufactured by Toyobo)

A resin composition obtained by blending a polycarbonate ($Tg_0$=143° C.) and copolyester Vylon 20 in an amount of 5 parts by mass based on 100 parts by mass of the polycarbonate shows a glass transition temperature $Tg_1$ of 142° C., and the reduction in glass transition temperature ($\Delta Tg$) defined by expression (A) is 0.2° C./%, which is smaller than 2.

6) Low-molecular-weight AS resin LITAC-A: Low-molecular-weight AS resin LITAC-A (120PCF, manufactured by A&L Inc.)

A resin composition obtained by blending a polycarbonate ($Tg_0$=143° C.) and the low-molecular-weight AS resin (LITAC-A) in an amount of 5 parts by mass based on 100 parts by mass of the polycarbonate shows a glass transition temperature $Tg_1$ of 143° C., and the reduction in glass transition temperature ($\Delta Tg$) defined by expression (A) is 0° C./%, which is smaller than 2.

7) Polyethylene glycol: Polyethylene glycol (Lion Corp.; PEG #4000; molecular weight, 4,000)

A resin composition obtained by blending a polycarbonate ($Tg_0$=143° C.) and the polyethylene glycol in an amount of 5 parts by mass based on 100 parts by mass of shows a glass transition temperature $Tg_1$ of 143° C., and the reduction in glass transition temperature ($\Delta Tg$) defined by expression (A) is 0° C./%, which is smaller than 2.

The measuring test methods and evaluation methods used in the Examples and Comparative Examples are as follows.
(Content of Carbon Fibers in Material for Molding, Shaped Product, or the Like)

The content of carbon fibers was determined by putting the material for molding such as a pellet or a sample cut out of the shaped product into a crucible, introducing the crucible into a muffle furnace in which the internal temperature was set at 600° C., thereby burning off the resin component, and calculating the content of carbon fibers from the mass of the residual carbon fibers. Meanwhile, the expression "content of carbon fibers (% by mass)" used for a material for molding or shaped product means the proportion of the mass of the carbon fibers to the mass of not the sum of only the carbon fibers and the polycarbonate but the whole including the impregnation aid, or the like.
(Content of Surface-Treating Agent)

The amount of a surface-treating agent such as an impregnation aid, contained in carbon fiber bundles which are easily impregnated, carbon fiber filaments, or the like, was determined by putting a carbon fiber bundle cut out in a length of 1 m into a crucible, introducing the crucible into a muffle furnace in which the internal temperature was set at 550° C. for 15 minutes to burn off the surface-treating agent component, and calculating the content of the surface-treating agent from the mass of the residual carbon fibers.
(Measurement of Tensile Strength)

Dumbbell specimens were produced from a material for molding obtained, by means of an injection molding machine and subjected to a measurement of tensile strength in accordance with ISO 527 (JIS K 7161).
(Evaluation of Surface Appearance of Shaped Product)

The surface appearance of each of shaped products obtained was examined. The shaped products in which neither any fibrous lump with a diameter of 3 mm or larger, formed by insufficient impregnation of the polycarbonate into the carbon fiber bundles nor any bubble was observed in the surface thereof are indicated by ○ (good); the shaped products in which a bubble was observed although no such fibrous lump was observed are indicated by Δ (fair); and the shaped products in which such fibrous lump was observed are indicated by x (poor).
(Evaluation of the Length of Carbon Fibers in Shaped Product)

A specimen having a size of 20 mm×10 mm was cut out of each composite shaped product obtained and heated at 550° C. in an oxygen-containing atmosphere for 1.5 hours to burn off the resin component. The residual carbon fibers were added to water containing a surfactant, and this mixture was sufficiently stirred by ultrasonic vibration. The dispersion obtained through the stirring was randomly sampled with a measuring spoon to obtain a sample for evaluation. This sample was examined with image analyzer Luzex AP, manufactured by Nireco Corp., to measure the lengths of 3,000 fibers. An average of the lengths was calculated to determine the average fiber length of the carbon fibers contained in the shaped product. Details are shown below in Examples and Comparative Examples.

Example 1

As an impregnation aid, bisphenol-A bis(diphenyl phosphate) (CR-741, manufactured by Daihachi Chemical Co., Ltd.), which is an aromatic polyphosphate ester was used. This impregnation aid was emulsified so as to result in a nonvolatile content of 12% by mass. PAN-based carbon fiber filaments (STS40, manufactured by Toho Tenax Co., Ltd.; corresponding to 24K; fiber diameter, 7.0 μm; number of filaments, 24,000; tensile strength, 4,000 MPa) as carbon fiber bundles were passed through the resultant solution. Thereafter, the carbon fiber filaments were passed between nip rolls to remove the excess adhered solution and then passed over 2 minutes through a hot-air drying oven heated at 180° C., thereby drying the carbon fiber filaments. The carbon fiber bundles which are easily impregnated obtained by the treatment were passed along two metallic rolls having a diameter of 60 mm and heated at 200° C., thereby conducting a heat treatment again to obtain carbon fiber bundles which are easily impregnated in which the impregnation aid was more evenly adhered to the carbon fiber bundles. The carbon fiber bundles which are easily impregnated had a content of the impregnation aid of 5% by mass (5.3 parts by mass based on 100 parts by mass of the carbon fibers).

Subsequently, the carbon fiber bundles which are easily impregnated obtained above were coated with a polycarbonate (L-1225Y, manufactured by Teijin Chemicals Ltd.) using a crosshead die for electrical-wire coating having an orifice diameter of 3 mm and were then cut into a length of 6 mm, thereby obtaining a material for molding in the form of core/sheath pellets suitable for injection molding, the material for molding having a content of carbon fibers of 20% by mass (the amount of the polycarbonate was 394.7 parts by mass based on 100 parts by mass of the carbon fibers), a diameter of 3.2 mm, and a length of 6 mm. Using a 110-ton electric injection molding machine (J110AD) manufactured by The Japan Steel Works, Ltd., the material for molding was injection-molded at cylinder temperatures of C1/C2/C3/C4/N=280° C./290° C./300° C./300° C./300° C. (C1 to C4 were cavity and N was nozzle) at a molding cycle time of 35 seconds to obtain dumbbells for tensile test having a thickness of 4 mm. The shaped products obtained had a satisfactory appearance in which neither any fibrous lump due to dispersion failure nor a bubble was observed. The shaped products had a tensile strength of 162 MPa to show excellent mechanical properties. The fibers contained in the shaped products had an average length of 0.9 mm. The results obtained are shown in Table 1.

Example 2

The same procedure as in Example 1 was conducted, except that the concentration of the solution obtained by emulsifying bisphenol-A bis(diphenyl phosphate) as an impregnation aid was adjusted to a nonvolatile content of 25% by weight to treat the carbon fiber filaments, and resulting in obtaining carbon fiber bundles which are easily impregnated having a content of the impregnation aid of 10% by mass (11.1 parts by mass based on 100 parts by mass of the carbon fibers). The shaped products obtained showed a satisfactory appearance and mechanical properties. The results obtained are shown in Table 1.

Example 3

The same procedure as in Example 2 was conducted, except that the coating of the carbon fiber bundles which are easily impregnated with the polycarbonate (L-1225Y, manufactured by Teijin Chemicals Ltd.) using a crosshead die for electrical-wire coating having an orifice diameter of 3 mm was conducted so that the pellet-form material for molding obtained had a content of carbon fibers of 30% by mass (the amount of the polycarbonate was 222.2 parts by mass based on 100 parts by mass of the carbon fibers). The shaped products obtained showed a satisfactory appearance and mechanical properties. The results obtained are shown in Table 1.

Example 4

The same procedure as in Example 1 was conducted, except that the polycaprolactone (PLACCEL (registered trademark) H1P, manufactured by Daicel Chemical Industries, Ltd.; molecular weight, 10,000), which is a polyester based on an aliphatic hydroxycarboxylic acid, was used as an impregnation aid in place of the bisphenol-A bis(diphenyl phosphate) and was emulsified to obtain an emulsion having a nonvolatile content of 12% by mass, and the carbon fiber filaments were treated with the emulsion to obtain carbon fiber bundles which are easily impregnated having a content of the polycaprolactone impregnation aid of 5% by mass (5.3 parts by mass based on 100 parts by mass of the carbon fibers). The shaped products obtained showed a satisfactory appearance and mechanical properties. The results obtained are shown in Table 1.

Example 5

The same procedure as in Example 4 was conducted, except that the concentration of the solution obtained by emulsifying polycaprolactone as an impregnation aid was adjusted to obtain an emulsion having a nonvolatile content of 25% by mass to treat the carbon fiber filaments, and resulting in obtaining carbon fiber bundles which are easily impregnated having a content of the polycaprolactone impregnation aid of 10% by mass (11.1 parts by mass based on 100 parts by mass of the carbon fibers). The shaped products obtained showed a satisfactory appearance and mechanical properties. The results obtained are shown in Table 1.

Example 6

The same procedure as in Example 1 was conducted, except that trimethyl phosphate (TMP, manufactured by Daihachi Chemical Co., Ltd.) was used as an impregnation aid in place of the bisphenol-A bis(diphenyl phosphate) and was emulsified to obtain an emulsion having a nonvolatile content of 25% by mass, and that the carbon fiber filaments were treated with the emulsion to obtain carbon fiber bundles which are easily impregnated having a content of the trimethyl phosphate impregnation aid of 10% by mass (11.1 parts by mass based on 100 parts by mass of the carbon fibers). The shaped products obtained showed a sufficient tensile strength and had an appearance in which no fibrous lump was observed in the surface. However, bubbles were observed in the surface. The results obtained are shown in Table 1.

Example 7

The same procedure as in Example 1 was conducted, except that triphenyl phosphate (TPP, manufactured by Daihachi Chemical Co., Ltd.) was used as an impregnation aid in place of the bisphenol-A bis(diphenyl phosphate) and was emulsified to obtain an emulsion solution having a nonvolatile content of 12% by mass, and that the carbon fiber filaments were treated with the solution to obtain carbon fiber bundles which are easily impregnated having a content of the triphenyl phosphate impregnation aid of 10% by mass (11.1 parts by mass based on 100 parts by mass of the carbon fibers). The shaped products obtained showed a satisfactory appearance and mechanical properties. The results obtained are shown in Table 1.

Example 8

The same procedure as in Example 4 was conducted, except that the concentration of the solution obtained by emulsifying polycaprolactone as an impregnation aid was adjusted to obtain an emulsion having a nonvolatile content of 12% by mass to treat the carbon fiber filaments, resulting in obtaining carbon fiber bundles which are easily impregnated having a content of the polycaprolactone impregnation aid of 3% by mass (4 parts by mass based on 100 parts by mass of the carbon fibers). The shaped products obtained showed a satisfactory appearance and mechanical properties. The results obtained are shown in Table 1.

Example 9

The same procedure as in Example 4 was conducted, except that in place of the emulsion solution of polycaprolactone as an impregnation aid, the polycaprolactone which was melted and liquefied by heating at 120° C., that the molten polycaprolactone was dropped onto the surface of the carbon fiber bundles and the carbon fiber bundles were then passed through a hot bar heated at 120° C., thereby impregnating the molten polycaprolactone into the carbon bundles, and that by thus treating the carbon fiber bundles, carbon fiber bundles which are easily impregnated having a content of the polycaprolactone impregnation aid of 8% by mass (8.7 parts by mass based on 100 parts by mass of the carbon fibers) were obtained. The shaped products obtained showed a satisfactory appearance and mechanical properties. The results obtained are shown in Table 1.

Comparative Example 1

The same procedure as in Example 1 was conducted, except that the concentration of the solution obtained by emulsifying bisphenol-A bis(diphenyl phosphate) as an impregnation aid was adjusted to a nonvolatile content of 5% by weight to treat the carbon fiber filaments, resulting in obtaining carbon fiber bundles having a content of the impregnation aid of 2% by mass (2 parts by mass based on 100 parts by mass of the carbon fibers). In the surface of the shaped products obtained, there were fiber bundle lumps due to dispersion failure. The shaped products had a low value of tensile strength. The results obtained are shown in Table 1.

Comparative Example 2

In place of manufacturing easily impregnable carbon fibers using an impregnation aid, PAN-based carbon fiber filaments impregnated with 1.2% by mass urethane-epoxy binder (STS40-F13, manufactured by Toho Tenax Co., Ltd.; average diameter, 7 μm; number of filaments, 24,000) were used. The subsequent procedure including the coating of the carbon fiber filaments with a polycarbonate (L-1225Y, manufactured by Teijin Chemicals Ltd.) was conducted in the same manner as in Example 1. In the surface of the shaped products obtained, there were fiber bundle masses due to dispersion failure. The shaped products had a low value of tensile strength. The results obtained are shown in Table 1.

Comparative Example 3

The same procedure as in Example 1 was conducted, except that the resin for coating the carbon fiber bundles which are easily impregnated was changed from the polycarbonate to polyamide-6 (so-called nylon-6; UBE Nylon 1015B, manufactured by Ube Industries, Ltd.). The shaped products obtained had a low tensile strength and had a poor appearance.

Comparative Example 4

A carbon-fiber-reinforced polycarbonate (Panlite B-8130, manufactured by Teijin Chemicals Ltd.) which was a material produced by melt-kneading 100 parts by mass of carbon fibers and 233.3 parts by mass of a polycarbonate in a twin-screw extruder and forming the mixture into pellets having a content of carbon fibers of 30% by mass was injection-molded under the same conditions as in Example 1. In the shaped product obtained, the carbon fibers were in a satisfactorily dispersed state. However, the carbon fibers in the shaped product had an average fiber length of 0.15 mm, which is short, and the tensile strength was 140 MPa, which was not a satisfactory value.

Comparative Example 5

The same carbon fiber bundles as those used in Example 1 were coated, without being treated with polycaprolactone as an impregnation aid, with a polycarbonate (L-1225Y, manufactured by Teijin Chemicals Ltd.) using a crosshead die for electrical-wire coating having an orifice diameter of 3 mm, and then cut into a length of 6 mm to obtain pellets having a content of carbon fibers of 20% by mass (the amount of the polycarbonate was 394.7 parts by mass based on 100 parts by mass of the carbon fibers), a diameter of 3.2 mm, and a length of 6 mm. Polycaprolactone was added in an amount of 5.3 parts by mass to the pellets (later addition) to obtain a material for molding suitable for injection molding. This material for molding was injection-molded under the same conditions as in Example 1 to obtain dumbbells for tensile test having a thickness of 4 mm. The shaped products obtained had a low tensile strength and a poor appearance. The results obtained are shown in Table 1.

Comparative Example 6

The same procedure as in Example 4 was conducted, except that the concentration of the solution obtained by emulsifying polycaprolactone as an impregnation aid was adjusted to obtain an emulsion having a nonvolatile content of 12% by mass to treat the carbon fiber filaments, resulting in obtaining carbon fiber bundles which are easily impregnated having a content of the polycaprolactone of 1.5% by mass (2 parts by mass based on 100 parts by mass of the carbon fibers). The shaped products obtained had a low tensile strength and a poor appearance. The results obtained are shown in Table 1.

Comparative Example 7

The same procedure as in Example 4 was conducted, except that the concentration of the solution obtained by emulsifying polycaprolactone as an impregnation aid was adjusted to obtain an emulsion having a nonvolatile content of 12% by mass to treat the carbon fiber filaments, resulting in obtaining carbon fiber bundles which are easily impregnated having a content of the polycaprolactone impregnation aid of 18% by mass (20 parts by mass based on 100 parts by mass of the carbon fibers). The shaped products obtained showed a satisfactory appearance. However, the carbon fibers in the shaped products had an average fiber length of 0.4 mm, which is short, and the tensile strength was 150 MPa, which was not a satisfactory value. Furthermore, the shaped products had poor heat resistance. The results obtained are shown in Table 1.

Comparative Example 8

The same procedure as in Example 1 was conducted, except that copolyester Vylon 220 (manufactured by Toyobo Co., Ltd.) was used as a comparative impregnation aid in place of the bisphenol-A bis(diphenyl phosphate) as an impregnation aid and was emulsified to obtain an emulsion having a nonvolatile content of 12% by mass, and that the carbon fiber filaments were treated with the emulsion to obtain carbon fiber bundles which are easily impregnated in which the content of copolyester Vylon 220 used as a comparative impregnation aid was 10% by mass (11.1 parts by mass based on 100 parts by mass of the carbon fibers). The shaped products obtained had a low tensile strength and a poor appearance. The results obtained are shown in Table 1.

Comparative Example 9

The same procedure as in Example 1 was conducted, except that low-molecular-weight AS resin LITAC-A (120PCF, manufactured by A&L Inc.) was used as a comparative impregnation aid in place of the bisphenol-A bis(diphenyl phosphate) as an impregnation aid and was emulsified to obtain an emulsion having a nonvolatile content of 12% by mass, and that the carbon fiber filaments were treated with the emulsion to obtain carbon fiber bundles which are easily impregnated in which the content of low-molecular-weight AS resin LITAC-A used as a comparative impregnation aid was 5% by mass (5.3 parts by mass based on 100 parts by mass of the carbon fibers). The shaped products obtained had a low tensile strength and a poor appearance. The results obtained are shown in Table 1.

Comparative Example 10

The same procedure as in Example 1 was conducted, except that polyethylene glycol (PEG #4000, manufactured by Lion Corp.; molecular weight 4,000) was used as an impregnation aid in place of the bisphenol-A bis(diphenyl phosphate) and was emulsified to obtain an emulsion having a nonvolatile content of 12% by mass, and that the carbon fiber filaments were treated with the emulsion to obtain carbon fiber bundles which are easily impregnated in which the content of the polyethylene glycol impregnation aid was 10% by mass (11.1 parts by mass based on 100 parts by mass of the carbon fibers). The shaped products obtained had a low tensile strength and had a poor appearance. The results obtained are shown in Table 1.

In Examples 1 to 9 given above, shaped products containing satisfactorily dispersed carbon fibers and having excellent mechanical properties were obtained. It is hence apparent that when the material for molding of the invention is molded, the polycarbonate is smoothly impregnated into the carbon fiber bundles which are easily impregnated. The inventors attempted to more directly ascertain the degree of impregnability of the carbon fiber bundles which are easily impregnated of each Example. However, in the case of injection molding, for example, it may be thought that the molding machine is operated in such a manner that the material for molding is plasticated and, in the stage where the polycarbonate begins to be impregnated into the carbon fiber bundles which are easily impregnated, the molding machine is quickly stopped and a sample is taken out. This operation is problematic from the standpoint of safety and has the possibility of damaging the molding machine. Such methods have hence been difficult to conduct.

Consequently, the inventors employed the following method. The same carbon fiber bundles which are easily impregnated, carbon fiber filaments, or the like as in each of the Examples and Comparative Examples was used, and a sheet-form polycarbonate was placed thereon. This material for molding was heated on a metal plate for a short period, and this sample was examined to determine the degree of impregnation of the polycarbonate as a matrix resin (hereinafter referred to as degree of matrix resin impregnation, in the case where a thermoplastic resin other than polycarbonate was used). Thus, impregnability was evaluated. The carbon fiber bundles which are easily impregnated and the like of Examples 1 to 9 and Comparative Examples 1 to 10 were evaluated for impregnability, and the results thereof are shown below as Reference Examples A to H and Comparative Reference Examples A to I, respectively.

Reference Example A

A sheet-form polycarbonate (L-1225Y, manufactured by Teijin Chemicals Ltd.) having a thickness of 300 µm, width of 10 mm, and length of 20 mm was placed on the upper surface of the carbon fiber bundles which are easily impregnated (width, 10 mm; length, 20 mm) obtained in the same manner as in Example 1 and in which the content of bisphenol-A bis(diphenyl phosphate) was 5% by mass (5.3 parts by mass based on 100 parts by mass of the carbon fibers). The carbon fiber bundles in this state were placed on a hot plate heated at 280° C., and the carbon fiber bundles which are easily impregnated and the sheet-form polycarbonate were thus heated for 2 minutes. The portion where the polycarbonate melted by the heating was impregnated into the carbon fiber bundles which are easily impregnated comes into a wet state and single carbon fibers are bonded to each other by the polycarbonate. Meanwhile, the portion of the carbon fiber bundles was not impregnated with the polycarbonate is in a dry state, and single carbon fibers were not bonded to each other with the polycarbonate and were liable to separate. Consequently, such single carbon fibers were separated from the portion of the heated sample which was not impregnated with the polycarbonate, and the mass thereof was measured. The degree of matrix resin impregnation into the carbon fiber bundles which are easily impregnated, in the case where the matrix resin was a polycarbonate, was calculated using the following calculation formula (D).

Degree of matrix resin impregnation (% by mass)=
100−[(mass of single carbon fibers unimpregnated with the matrix resin)/(mass of carbon fiber bundles)]×100    (D)

The degree of matrix resin impregnation was as extremely high as 98% by mass, and it was able to be ascertained that the carbon fiber bundles which are easily impregnated used in Example 1 were highly apt to be impregnated with the polycarbonate.

Reference Example B

The same procedure as in Reference Example A was conducted, except that the carbon fiber bundles which are easily impregnated (width, 10 mm; length, 20 mm) obtained in the same manner as in Examples 2 and 3 and in which the content of bisphenol-A bis(diphenyl phosphate) was 10% by mass (11.1 parts by mass based on 100 parts by mass of the carbon fibers) were used. The degree of matrix resin impregnation was as extremely high as 100% by mass, and it was able to be ascertained that the carbon fiber bundles which are easily impregnated used in Examples 2 and 3 were highly apt to be impregnated with the polycarbonate.

Reference Example C

The same procedure as in Reference Example A was conducted, except that the carbon fiber bundles which are easily impregnated (width, 10 mm; length, 20 mm) obtained in the same manner as in Example 4 and in which the content of polycaprolactone as an impregnation aid was 5% by mass (5.3 parts by mass based on 100 parts by mass of the carbon fibers) were used. The degree of matrix resin impregnation was as extremely high as 95% by mass, and it was able to be ascertained that the carbon fiber bundles which are easily impregnated used in Example 4 were highly apt to be impregnated with the polycarbonate.

Reference Example D

The same procedure as in Reference Example A was conducted, except that the carbon fiber bundles which are easily impregnated (width, 10 mm; length, 20 mm) obtained in the same manner as in Example 5 and in which the content of polycaprolactone as an impregnation aid was 10% by mass (11.1 parts by mass based on 100 parts by mass of the carbon fibers) were used. The degree of matrix resin impregnation was as extremely high as 100% by mass, and it was able to be ascertained that the carbon fiber bundles which are easily impregnated used in Example 5 were highly apt to be impregnated with the polycarbonate.

Reference Example E

The same procedure as in Reference Example A was conducted, except that the carbon fiber bundles which are easily impregnated (width, 10 mm; length, 20 mm) obtained in the same manner as in Example 6 and in which the content of trimethyl phosphate as an impregnation aid was 10% by mass (11.1 parts by mass based on 100 parts by mass of the carbon fibers) were used. The degree of matrix resin impregnation was as high as 73% by mass, and it was able to be ascertained that the carbon fiber bundles which are easily impregnated used in Example 6 were apt to be impregnated with the polycarbonate.

Reference Example F

The same procedure as in Reference Example A was conducted, except that the carbon fiber bundles which are easily impregnated (width, 10 mm; length, 20 mm) obtained in the same manner as in Example 7 and in which the content of triphenyl phosphate as an impregnation aid was 10% by mass (11.1 parts by mass based on 100 parts by mass of the carbon fibers) were used. The degree of matrix resin impregnation was as extremely high as 96% by mass, and it was able to be ascertained that the carbon fiber bundles which are easily impregnated used in Example 7 were highly apt to be impregnated with the polycarbonate.

Reference Example G

The same procedure as in Reference Example A was conducted, except that the carbon fiber bundles which are easily impregnated (width, 10 mm; length, 20 mm) obtained in the same manner as in Example 8 and in which the content of polycaprolactone as an impregnation aid was 3% by mass (4 parts by mass based on 100 parts by mass of the carbon fibers) were used. The degree of matrix resin impregnation was as high as 83% by mass, and it was able to be ascertained that the carbon fiber bundles which are easily impregnated used in Example 8 were apt to be impregnated with the polycarbonate.

Reference Example H

The same procedure as in Reference Example A was conducted, except that the carbon fiber bundles which are easily impregnated (width, 10 mm; length, 20 mm) obtained in the same manner as in Example 9 and in which the content of polycaprolactone as an impregnation aid was 8% by mass (5.3 parts by mass based on 100 parts by mass of the carbon fibers) were used. The degree of matrix resin impregnation was as extremely high as 100% by mass, and it was able to be ascertained that the carbon fiber bundles which are easily impregnated used in Example 9 were highly apt to be impregnated with the polycarbonate.

Comparative Reference Example A

The same procedure as in Reference Example A was conducted, except that the carbon fiber bundles (width, 10 mm; length, 20 mm) which obtained in the same manner as in Comparative Example 1 and in which the content of bisphenol-A bis(diphenyl phosphate) as an impregnation aid was 2% by mass (2 parts by mass based on 100 parts by mass of the carbon fibers) were used. The degree of matrix resin impregnation was as low as 32% by mass, and the carbon fiber bundles used in Comparative Example 1, having an impregnation aid content of 2% by mass, were not easily impregnated with the polycarbonate.

Comparative Reference Example B

The same procedure as in Reference Example A was conducted, except that in place of the carbon fiber bundles which are easily impregnated, the same carbon fiber filaments as in Comparative Example 2, i.e., carbon fiber filaments impregnated with 1.2% by mass urethane-epoxy sizing agent (STS40-F13, manufactured by Toho Tenax Co., Ltd.; average diameter, 7 μm; number of filaments, 24,000). The degree of matrix resin impregnation was as extremely low as 2% by mass, and the carbon fiber filaments used in Comparative Example 2 were extremely less apt to be impregnated with the polycarbonate.

Comparative Reference Example C

The same procedure as in Reference Example A was conducted in which, in place of the sheet-form polycarbonate (L-1225Y, manufactured by Teijin Chemicals Ltd.) having a thickness of 300 μm, width of 10 mm, and length of 20 mm, a sheet of polyamide-6 (UBE Nylon 1015B, manufactured by Ube Industries, Ltd.) having the same dimensions was placed on the upper surface of the carbon fiber bundles which are easily impregnated (width, 10 mm; length, 20 mm) obtained in the same manner as in Example 1 and in which the content of bisphenol-A bis(diphenyl phosphate) was 5% by mass (5.3 parts by mass based on 100 parts by mass of the carbon fibers). The degree of matrix resin impregnation determined using calculation formula (D) in which the matrix resin was not polycarbonate but polyamide-6 was as extremely low as 4% by mass, and the carbon fiber bundles which are easily impregnated used in Example 2 were found to be extremely less apt to be impregnated with polyamide-6.

Comparative Reference Example D

The same procedure as in Reference Example A was conducted, except that in place of the carbon fiber bundles which are easily impregnated, the carbon fiber bundles obtained by incorporating the same impregnation aid as in Comparative Example 5 by later addition and in which the content of polycaprolactone as the impregnation aid was 1.2% by mass were used. The degree of matrix resin impregnation was as extremely low as 2% by mass, and the carbon fiber filaments used in Comparative Example 5 were extremely less apt to be impregnated with the polycarbonate.

Comparative Reference Example E

The same procedure as in Reference Example A was conducted, except that the carbon fiber bundles obtained in the same manner as in Comparative Example 6 and in which the content of polycaprolactone as an impregnation aid was 1.5% by mass were used. The degree of matrix resin impregnation was as low as 28% by mass, and the carbon fiber bundles used in Comparative Example 6, having an impregnation aid content of 1.5% by mass, were not easily impregnated with the polycarbonate.

Comparative Reference Example F

The same procedure as in Reference Example A was conducted, except that the carbon fiber bundles obtained in the same manner as in Comparative Example 7 and in which the content of bisphenol-A bis(diphenyl phosphate) as an impregnation aid was 18% by mass were used. The degree of matrix resin impregnation was an extremely high as 100% by mass, and it was able to be ascertained that the carbon fiber bundles which are easily impregnated used in Comparative Example 7 were highly apt to be impregnated with the polycarbonate.

Comparative Reference Example G

The same procedure as in Reference Example A was conducted, except that the carbon fiber bundles obtained in the same manner as in Comparative Example 8 and in which the content of the copolyester as an impregnation aid was 10% by mass were used. The degree of matrix resin impregnation was as extremely low as 16% by mass, and the carbon fiber bundles used in Comparative Example 8, in which the impregnation aid was a copolyester, were not easily impregnated with the polycarbonate.

Comparative Reference Example H

The same procedure as in Reference Example A was conducted, except that the carbon fiber bundles obtained in the same manner as in Comparative Example 9 and in which the content of the low-molecular-weight AS resin as an impregnation aid was 5% by mass were used. The degree of matrix resin impregnation was as extremely low as 12% by mass, and the carbon fiber bundles used in Comparative Example 9, in which the impregnation aid was a low-molecular-weight AS resin, were not easily impregnated with the polycarbonate.

Comparative Reference Example I

The same procedure as in Reference Example A was conducted, except that the carbon fiber bundles which are easily impregnated obtained in the same manner as in Comparative Example 10 and in which the content of polyethylene glycol as an impregnation aid was 10% by mass were used. The degree of matrix resin impregnation was as high as 64% by mass, and the carbon fiber bundles used in Comparative Example 10, in which the impregnation aid was polyethylene glycol, were not easily impregnated with the polycarbonate.

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Amount of matrix resin (parts by mass based on 100 parts by mass of carbon fibers) | | | | | | | | | |
| Polycarbonate | 394.7 | 388.9 | 222.2 | 394.7 | 388.9 | 388.9 | 388.9 | 396 | 394.7 |
| Polyamide-6 | — | — | — | — | — | — | — | — | — |
| Content of surface-treating agent (parts by mass based on 100 parts by mass of carbon fibers) | | | | | | | | | |
| [Impregnation aid] | | | | | | | | | |
| Bisphenol-A bis(diphenyl phosphate) | 5.3 | 11.1 | 11.1 | — | — | 11.1 | — | — | — |
| Trimethyl phosphate | — | — | — | — | — | — | — | — | — |
| Triphenyl phosphate | — | — | — | — | — | — | 11.1 | — | 8.7 |
| Polycaprolactone | — | — | — | 5.3 | 11.1 | — | — | 4 | — |
| [Comparative impregnation aid] | | | | | | | | | |
| Copolyester Vylon 220 | — | — | — | — | — | — | — | — | — |
| Low-molecular-weight AS resin LITAC-A 120PCF (A&L Inc.) | — | — | — | — | — | — | — | — | — |
| Polyethylene glycol (molecular weight, 4000) | — | — | — | — | — | — | — | — | — |
| Method of applying surface-treating agent | emulsion | emulsion | emulsion | emulsion | emulsion | emulsion | emulsion | emulsion | (*2) |
| Solubility in water | 1.11 × 10⁻⁴ (g/L) | 1.11 × 10⁻⁴ (g/L) | 1.11 × 10⁻⁴ (g/L) | insoluble | insoluble | 500 (g/L) | insoluble | insoluble | insoluble |
| [Other treating agent] | | | | | | | | | |
| Urethane-epoxy binder | — | — | — | — | — | — | — | — | — |
| Content of surface-treating agent in carbon fiber bundles or the like | 5% | 10% | 10% | 5% | 10% | 10% | 10% | 3% | 8% |
| [Shaped product] | | | | | | | | | |
| Content of carbon fibers | 20% | 20% | 30% | 20% | 20% | 20% | 20% | 20% | 20% |
| Average fiber length [mm] | 0.9 | 0.7 | 0.7 | 0.8 | 0.6 | 0.8 | 0.7 | 0.9 | 0.7 |
| Tensile strength [MPa] | 162 | 166 | 196 | 171 | 173 | 158 | 160 | 167 | 173 |
| Appearance of shaped product | ○ | ○ | ○ | ○ | ○ | Δ | ○ | Δ | ○ |
| Heat resistance | ○ | ○ | ○ | ○ | ○ | ○ | ○ | ○ | ○ |
| [Evaluation of impregnability of carbon fiber bundles] | | | | | | | | | |
| Corresponding Reference Example | Reference Example A | Reference Example B | Reference Example B | Reference Example C | Reference Example D | Reference Example E | Reference Example F | Reference Example G | Reference Example H |
| Degree of matrix resin infiltration | 98% | 100% | 100% | 95% | 100% | 73% | 96% | 83% | 100% |
| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |

*1) % means % by mass unless otherwise indicated.
(*2) Polycaprolactone melted and liquefied by heating at 120° C. was dropped onto the surface of carbon fiber bundles, which were then passed through a 120° C. hot bar to be impregnate the molten polycaprolactone into the carbon bundles.

TABLE 1-continued

| | Comp. Reference Example A | Comp. Reference Example B | Comp. Reference Example C | | Comp. Reference Example D | Comp. Reference Example E | Comp. Reference Example F | Comp. Reference Example G | Comp. Reference Example H | Comp. Reference Example I |
|---|---|---|---|---|---|---|---|---|---|---|
| Amount of matrix resin (parts by mass based on 100 parts by mass of carbon fibers) | | | | | | | | | | |
| Polycarbonate | 398 | — | — | 233.3 | 394.7 | 398 | 380-384 | 394.7 | 394.7 | 394.7 |
| Polyamide-6 | — | 398.8 | 388.9 | — | — | — | — | — | — | — |
| Content of surface-treating agent (parts by mass based on 100 parts by mass of carbon fibers) | | | | | | | | | | |
| [Impregnation aid] | | | | | | | | | | |
| Bisphenol-A bis(diphenyl phosphate) | 2.0 | — | 11.1 | — | — | — | — | — | — | — |
| Trimethyl phosphate | — | — | — | — | — | — | — | — | — | — |
| Triphenyl phosphate | — | — | — | — | (5.3) | 2.0 | 20.0 | — | — | — |
| Polycaprolactone | — | — | — | — | — | — | — | — | — | — |
| [Comparative impregnation aid] | | | | | | | | | | |
| Copolyester Vylon 220 | — | — | — | — | — | — | — | 11.1 | — | — |
| Low-molecular-weight AS resin LITAC-A 120PCF (A&L Inc.) | — | — | — | — | — | — | — | — | 5.3 | — |
| Polyethylene glycol (molecular weight, 4000) | — | — | — | — | — | — | — | — | — | 11.1 |
| Method of applying surface-treating agent | emulsion | emulsion | emulsion | emulsion | impregnation aid, later addition | emulsion | emulsion | emulsion | emulsion | emulsion |
| Solubility in water | $1.11 \times 10^{-4}$ (g/L) | insoluble | $1.11 \times 10^{-4}$ (g/L) | $1.11 \times 10^{-4}$ (g/L) | insoluble | insoluble | insoluble | soluble | insoluble | soluble |
| [Other treating agent] | | | | | | | | | | |
| Urethane-epoxy binder | — | — | — | — | — | — | — | — | — | — |
| Content of surface-treating agent in carbon fiber bundles or the like | 2% | 1.2% | 10% | 10% | 1.2% | 1.50% | 18% | 10% | 5% | 10% |
| [Shaped product] | | | | | | | | | | |
| Content of carbon fibers | 20% | 20% | 20% | 30% | 20% | 20% | 20% | 20% | 20% | 20% |
| Average fiber length [mm] | 1.4 | 2.1 | 1.8 | 0.15 | 2.1 | 1.5 | 0.4 | 0.9 | 1.4 | 0.9 |
| Tensile strength [MPa] | 124 | 116 | 145 | 140 | 118 | 126 | 150 | 132 | 135 | 155 |
| Appearance of shaped product | x | x | x | ○ | x | x | ○ | x | x | ○ |
| Heat resistance | ○ | ○ | ○ | ○ | ○ | ○ | Δ | ○ | ○ | Δ |
| [Evaluation of impregnability of carbon fiber bundles] | | | | | | | | | | |
| Corresponding Reference Example | Comp. Reference Example A | Comp. Reference Example B | Comp. Reference Example C | | Comp. Reference Example D | Comp. Reference Example E | Comp. Reference Example F | Comp. Reference Example G | Comp. Reference Example H | Comp. Reference Example I |
| Degree of matrix resin infiltration | 32% | 2% | 4% | | 2% | 28% | 100% | 16% | 12% | 64% |

*1) % means % by mass unless otherwise indicated.
*2) Polycaprolactone melted and liquefied by heating at 120° C. was dropped onto the surface of carbon fiber bundles, which were then passed through a 120° C. hot bar to infiltrate the molten polycaprolactone into the carbon bundles.

INDUSTRIAL APPLICABILITY

The material for molding of the invention makes it possible to produce shaped products having excellent mechanical strength by a simple method. This material for molding is extremely useful in various industrial fields including interior and exterior materials and components for transportation means, such as motor vehicles, ships, and aircraft, and for electrical/electronic appliances, business appliances, or the like.

While the invention has been described in detail and with reference to specific embodiments thereof, it will be apparent to one skilled in the art that various changes and modifications can be made therein without departing from the spirit and scope thereof.

This application is based on a Japanese patent application filed on Mar. 14, 2012 (Application No. 2012-057323), the contents thereof being incorporated herein by reference.

The invention claimed is:

1. A material for molding comprising:
carbon fiber bundles including carbon fibers;
at least one impregnation aid in an amount of 3 to 15 parts by mass based on 100 parts by mass of the carbon fibers, the at least one impregnation aid adhered mainly to the carbon fiber bundles and satisfying the following requirements 1 and 2; and
a polycarbonate in an amount of 66 to 2,000 parts by mass based on 100 parts by mass of the carbon fiber, wherein the impregnation aid is adhered to the carbon fiber bundles prior to coating with the polycarbonate:
Requirement 1: the liquid at 300° C. has a viscosity of 10 Pa·s or less
Requirement 2: a reduction ratio in glass transition temperature ($\Delta Tg$) of larger than 2 [° C./%], the reduction ratio in glass transition temperature ($\Delta Tg$) being defined by the following expression (A) including the glass transition temperature $Tg_1$[° C.] of a resin composition obtained by incorporating the impregnation aid in an amount of 1 part by mass to 100 parts by mass based on 100 parts by mass of the polycarbonate, the glass transition temperature $Tg_0$[° C.] of the polycarbonate, and the content (%) of the impregnation aid:

Reduction ratio in glass transition temperature
($\Delta Tg$)[° C./%]=[($Tg_0$[° C.])−($Tg_1$[° C.])]/(content of impregnation aid[%])     (A)

wherein the content of impregnation aid [%] is defined by the following expression (B):

Content of impregnation aid[%]=100×(amount of impregnation aid [parts by mass])/(amount of polycarbonate [parts by mass])     (B)

wherein the material for molding has a core/sheath structure in which the carbon fiber bundles and the at last one impregnation aid are core components and the polycarbonate is a sheath component.

2. The material for molding according to claim 1,
wherein the impregnation aid is selected from the group consisting of a phosphoric acid ester, a polyester based on an aliphatic hydroxycarboxylic acid, and a combination thereof.

3. The material for molding according to claim 2,
wherein the phosphoric acid ester is an aromatic phosphoric acid ester having a boiling point at ordinary pressure of 340° C. or higher and a loss on heating at 300° C. in a nitrogen atmosphere of 2%/min or less.

4. The material for molding according to claim 3,
wherein the aromatic phosphoric acid ester is represented by the following general formula (1):

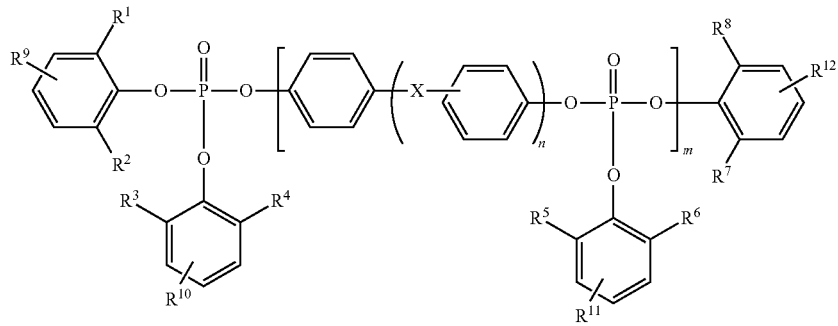

wherein in general formula (1), $R^1$ to $R^{12}$ are each independently a hydrogen atom or an alkyl group having 1 to 4 carbon atoms,
X is a bond, $-CH_2-$, $-C(CH_3)_2-$, $-S-$, $-SO_2-$, $-O-$, $-CO-$, or $-N=N-$,
n is an integer of 0 or 1, and
m is an integer of 0 to 5.

5. The material for molding according to claim 2,
wherein the polyester based on an aliphatic hydroxycarboxylic acid is selected from the group consisting of a homopolymer of ε-caprolactone, δ-caprolactone, β-propiolactone, γ-butyrolactone, δ-valerolactone, γ-valerolactone, and enantholactone, the homopolymer having a weight average molecular weight of 3,000 to 50,000, a copolymer of two or more thereof, having a weight average molecular weight of 3,000 to 50,000, and a combination thereof.

6. The material for molding according to claim 1,
wherein a form of the material for molding is a pellet.

7. The material for molding according to claim 6,
wherein the pellet has a longitudinal direction length of 3 to 10 mm.

8. A shaped product obtained from the material for molding according to claim 1.

9. The shaped product according to claim 8,
wherein the carbon fibers derived from the carbon fiber bundles are dispersed in a state of having an average fiber length of 0.3 mm or more.

10. The shaped product according to claim 8,
wherein a content of carbon fibers (% by mass) and a tensile strength of the material for molding determined by examination of a 4 mm dumbbell according to ISO 527 have a relationship satisfying the following expression (C):

[Content of carbon fibers (% by mass)]×3+90<[tensile strength (MPa)]     (C).

11. A method for manufacturing a shaped product, the method comprising:
providing the material for molding according to claim 1 in a mold under a condition of the plasticizing temperature or more of the polycarbonate to impregnate the polycarbonate into the carbon fiber bundles in the material for molding;
molding the material for molding while separating and dispersing the carbon fiber bundles in the carbon fiber bundles; and then
cooling the molded material.

12. A material for molding comprising:
carbon fiber bundles including carbon fibers;
at least one impregnation aid in an amount of 3 to 15 parts by mass based on 100 parts by mass of the carbon fibers, the at least one impregnation aid adhered evenly to the carbon fiber bundles and satisfying the following requirements 1 and 2; and
a polycarbonate in an amount of 66 to 2,000 parts by mass based on 100 parts by mass of the carbon fiber, wherein the impregnation aid is adhered to the carbon fiber bundles prior to coating with the polycarbonate:
Requirement 1: the liquid at 300° C. has a viscosity of 10 Pa·s or less
Requirement 2: a reduction ratio in glass transition temperature ($\Delta Tg$) of larger than 2 [° C./%], the reduction ratio in glass transition temperature ($\Delta Tg$) being defined by the following expression (A) including the glass transition temperature $Tg_1$[° C.] of a resin composition obtained by incorporating the impregnation aid in an amount of 1 part by mass to 100 parts by mass based on 100 parts by mass of the polycarbonate, the glass transition temperature $Tg_0$[° C.] of the polycarbonate, and the content (%) of the impregnation aid:

Reduction ratio in glass transition temperature ($\Delta Tg$)[° C./%]=[($Tg_0$[° C.])−($Tg_1$[° C.])]/(content of impregnation aid[%])     (A)

wherein the content of impregnation aid [%] is defined by the following expression (B):

Content of impregnation aid[%]=100×(amount of impregnation aid [parts by mass])/(amount of polycarbonate [parts by mass])     (B)

wherein the material for molding has a core/sheath structure in which the carbon fiber bundles and the at last one impregnation aid are core components and the polycarbonate is a sheath component.

13. The material for molding according to claim 12, wherein the impregnation aid is selected from the group consisting of a phosphoric acid ester, a polyester based on an aliphatic hydroxycarboxylic acid, and a combination thereof.

14. The material for molding according to claim 13, wherein the phosphoric acid ester is an aromatic phosphoric acid ester having a boiling point at ordinary pressure of 340° C. or higher and a loss on heating at 300° C. in a nitrogen atmosphere of 2%/min or less.

15. The material for molding according to claim 14, wherein the aromatic phosphoric acid ester is represented by the following general formula (1):

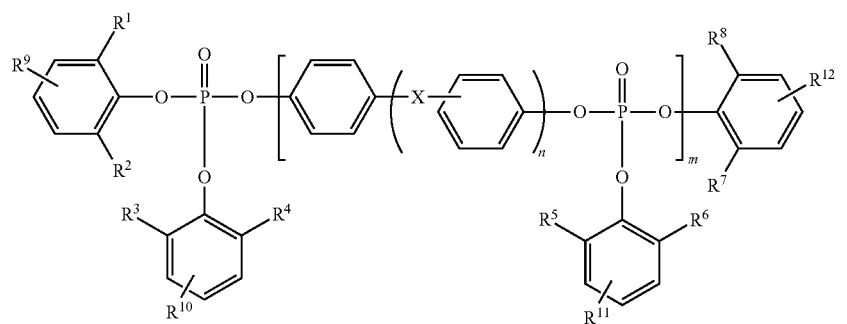

wherein in general formula (1), $R^1$ to $R^{12}$ are each independently a hydrogen atom or an alkyl group having 1 to 4 carbon atoms,
X is a bond, —$CH_2$—, —$C(CH_3)_2$—, —S—, —$SO_2$—, —O—, —CO—, or —N=N—,
n is an integer of 0 or 1, and
m is an integer of 0 to 5.

16. The material for molding according to claim 13, wherein the polyester based on an aliphatic hydroxycarboxylic acid is selected from the group consisting of a homopolymer of ε-caprolactone, δ-caprolactone, β-propiolactone, γ-butyrolactone, δ-valerolactone, γ-valerolactone, and enantholactone, the homopolymer having a weight average molecular weight of 3,000 to 50,000, a copolymer of two or more thereof, having a weight average molecular weight of 3,000 to 50,000, and a combination thereof.

17. The material for molding according to claim 12, wherein a form of the material for molding is a pellet.

18. The material for molding according to claim 17, wherein the pellet has a longitudinal direction length of 3 to 10 mm.

19. A shaped product obtained from the material for molding according to claim 12.

20. The shaped product according to claim 19, wherein the carbon fibers derived from the carbon fiber bundles are dispersed in a state of having an average fiber length of 0.3 mm or more.

* * * * *